United States Patent

Pember

[11] 4,074,653
[45] Feb. 21, 1978

[54] BIRD FRIGHTENER

[76] Inventor: Carleton R. Pember, 27331 Silveradd Canyon Road, Orange, Calif. 92667

[21] Appl. No.: 754,274

[22] Filed: Dec. 27, 1976

[51] Int. Cl.$^2$ ............................................. G08B 15/00
[52] U.S. Cl. ................................. 116/22 A; 64/28 R
[58] Field of Search ........................... 116/22 A, 22 R; 64/28 R; 310/78

[56] References Cited

U.S. PATENT DOCUMENTS

| 1,167,502 | 1/1916 | Huffman et al. | 116/22 A |
| 2,788,762 | 4/1957 | Wright | 116/22 A |
| 2,914,929 | 12/1959 | Irons | 64/28 R X |
| 3,799,105 | 3/1974 | Porter | 116/22 A |

FOREIGN PATENT DOCUMENTS

| 262,498 | 1/1962 | Australia | 116/22 A |
| 183,753 | 4/1918 | Canada | 116/22 A |
| 442,318 | 8/1912 | France | 116/22 R |

Primary Examiner—Daniel M. Yasich
Attorney, Agent, or Firm—William C. Babcock

[57] ABSTRACT

A bird frightener that may be removably disposed adjacent a tree or bush that bears fruit or berries that are attractive to birds as food. The bird frightener includes a pole that supports a prime mover on the upper end thereof, which prime mover rotates a number of spaced outwardly extending arms above the upper portion of the tree or bush. Each arm has at least one streamer thereon that waves as the arm rotates. Cam means operatively associated with the invention causes the arm to move upwardly and downwardly in what appears to an observer to be an erratic motion as the arms rotate. The upward and downward movement of the arms as they rotate, coupled with the waving streamers, is effective in frightening birds away from a tree or bush that has the invention mounted adjacent thereto, and as a result the fruit or berries on the tree or bush are not eaten by birds.

5 Claims, 6 Drawing Figures

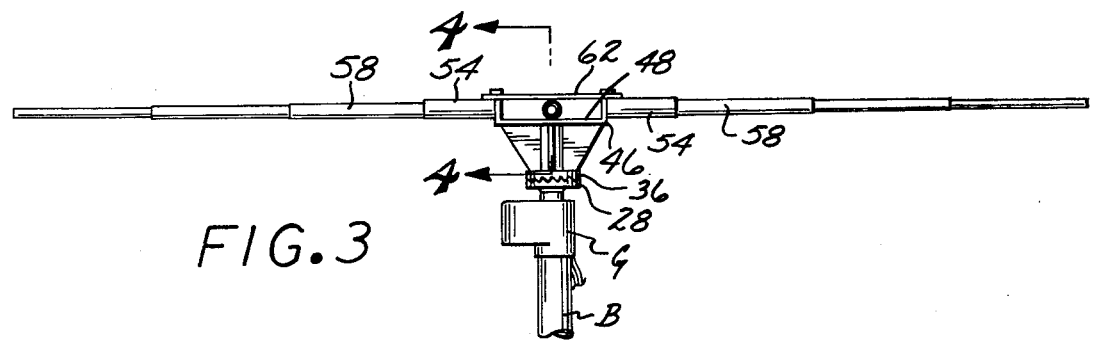
FIG. 3
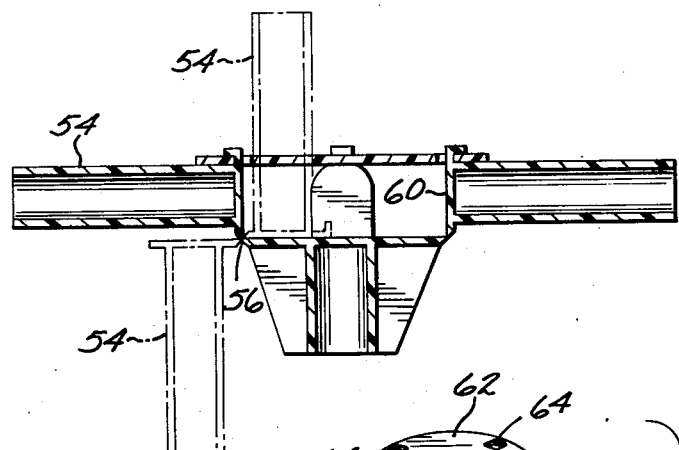
FIG. 4
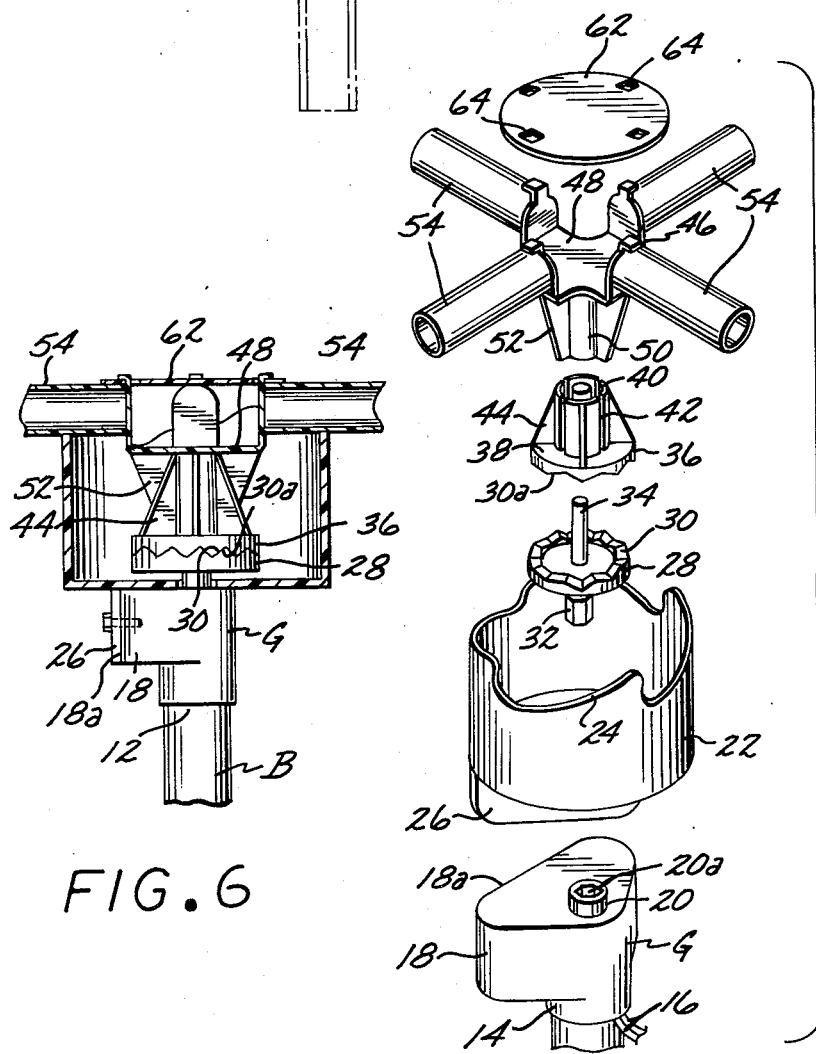
FIG. 5
FIG. 6
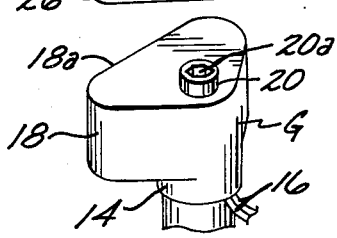

BIRD FRIGHTENER

BACKGROUND OF THE INVENTION

1. Field of the Invention
Bird Frightener.

2. Description of the Prior Art

The business of substantial magnitude is the growing of fruit and berries. Trees growing fruit such as cherries, pears, peaches, apples and the like are grown in both large and small orchards. Also, small fruit such as respberries, boysonberries, blueberries and the like are grown in bushes over extensive areas. Additionally, both trees bearing fruit and bushes bearing small fruits are frequently located adjacent single family residences in either large or small orchards or as a single tree or bush.

One of the favorite foods of birds is fruit, both fruit grown on trees and bushes. To prevent birds from attacking fruit grown on trees and bushes is extremely difficult, as birds are not subject to normal physical barriers such as fences or the like.

In the past, various types of devices have been used in attempts to scare birds away from trees and bushes bearing fruit, but such devices such as scarecrows have not proven to be satisfactory. Normally, birds are not frightened by human beings. A scarecrow makes no movement but remains as a stationary figure, and it does not take long to determine that the scarecrow is harmless. However, from experience it has been found that birds are frightened by inanimate objects that move, and particularly those that move with a sudden or erratic motion.

A major object of the present invention is to provide a device that may be removably disposed adjacent a tree or bush bearing fruit, and the device being of a height that the actuating portion thereof is situated above the tree or bush, and rotates one or more arms bearing streamers which arms rotate with an eccentric up and down movement that will frighten birds away from the bush or tree with which the invention is associated.

SUMMARY OF THE INVENTION

The bird frightener of the present invention includes an elongate pole that may be removably driven into the ground adjacent the trunk of a tree or bush bearing fruit. The pole is of such height that the upper end extends above the foilage of the tree or bush. The upper end of the pole supports a prime mover, preferably an electric motor, which, through a clutch mechanism, drives a head that pivotally supports a number of outwardly extending arms, each of which arms has a streamer attached thereto. As the head is driven, the arms are moved upwardly and downwardly through a clutch mechanism to give both rotational and vertical movement to the arms. This combination of rotation in substantially horizontal plane with periodic vertical movement of the arms, coupled with the streamers attached to the arms, gives a visual appearance to the streamers and arms that tends to frighten birds away from the bush or tree with which the invention is associated. The arms are so mounted on the head that they depend downwardly as the pole is moved upwardly through the foilage of the bush or tree, and after the arms and the head have been positioned above the foilage, the arms may be removably locked in outwardly extending positions. When it is desired to remove the invention from a tree or bush, the fastening means for maintaining the arms in outwardly extending positions is removed, and the arms are allowed to pivot upwardly as the pole and arms move downwardly relative to the foilage of the tree or bush.

BRIEF DESCRIPTION OF THE DRAWING

FIG. 3 is a side elevational view of the upper portion of the invention;

FIG. 4 is a fragmentary transverse cross-sectional view of the invention taken on the line 4—4 of FIG. 3;

FIG. 5 is an exploded perspective view of the invention; and

FIG. 6 is a cross-sectional view of the invention taken on the line 5—5 of FIG. 2.

DESCRIPTION OF THE PREFERRED EMBODIMENT

Figure 1:
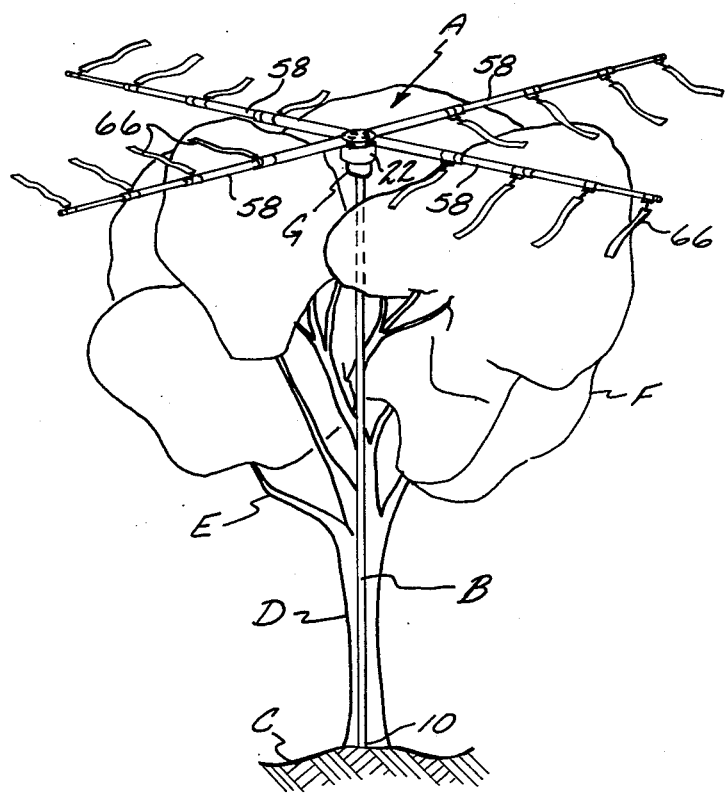
FIG. 1 is a perspective view of a fruit bearing tree with the invention disposed in a protective position adjacent thereto.

The bird frightener A as may best be seen in FIG. 1 includes a pole B that has a lower first end 10 that may be driven into the ground C adjacent the trunk D of a tree E that has foilage F. The second end of the pole supports a prime mover G, preferably an electric motor, that has a socket extending downwardly therefrom. The socket 14 of the motor G slidably engages the upper end 12 of the pole B. Electric power is supplied to the motor G through a pair of leads 16, or if desired a battery may be placed adjacent to the motor, which battery is not shown. The housing 18 of the motor G is illustrated as being of transverse triangular shape and by gear means (not shown) the motor rotates a driven member 20 at a relatively low speed of rotation. The driven member 20 has a cavity 20a of non-circular transverse cross section extending downwardly therein.

In FIG. 5 it will be seen that a cylindrical shell 22 is provided that has an upwardly disposed undulating cam edge 24. A plate 26 is rigidly secured to the shell 22 and extends downwardly therefrom, and is affixed to a flat side 18a of the housing 18 in such a manner that the driven member 20 is disposed at the center of the shell 22. The plate 26 may be secured to the flat side 18a of the housing 18 by conventional means (not shown).

A first circular clutch member 28 is provided that has a number of first circumferentially spaced teeth 30 defined on the upper peripheral edge thereof, and the clutch member 28 having a driving member 32 of non-circular transverse cross section depending therefrom that may be slidably inserted into the cavity 20a. A member 34 of circular transverse cross section extends upwardly from the first clutch member 28 and is centrally disposed thereon. A second clutch member 36 is provided that includes a rigid flat ring 38 that has a cylindrical shell 40 extending upwardly therefrom in which a number of circumferentially spaced longitudinally extending slots 42 are defined. The ring 38 has a number of shallow downwardly extending circumferentially spaced teeth 30a formed thereon that are engaged by the first teeth 30 when the rings 38 rest on the first clutch member 28.

In FIG. 5 it will be seen that reinforcing members 44 are provided that extend between the second clutch member 36 and segments of the cylindrical shell 40.

A head 46 is provided that is preferably moulded from a polymerized resin and includes a drive plate 48 that has an elongate member 50 extending downwardly therefrom and from which member a number of circumferentially spaced radially extending ribs 52 project. A number of tubular members 54 extend outwardly in circumferentially spaced relationship from the member 50, and are connected thereto by hinge means 56. Preferably the hing means 56 are thin portions of the plastic defining the head, which provide what is termed in the industry as "living hinges" and permit the tubular members 54 to pivot through 180° relative to drive plate 48 as shown in phantom line in FIG. 4.

Each of the tubular members 54 as may be seen in FIG. 3 includes a sequence of tubular telescopically adjustable sections that cooperate to define an arm 58 of variable length. Each of the tubular members 54 adjacent the head 46 is closed and includes an upwardly extending inverted L-shaped member 60. When it is desired to hold the tubular members 54 and arms 58 in outwardly extending positions in a common horizontal plane as shown in FIG. 3, a plate 62 that has a number of slots 64 therein is laid over the head as shown in FIG. 4, with the slots being removably engaged by the inverted L-shaped member 60. The assembly abovedescribed is of such dimensions that when it is disposed in as shown in FIG. 3 the tubular member 54 rest on the cam edge 24. Thus, as the head 46 is rotated by the prime mover G, the tubular members 54 and arms 58 supported therefrom not only rotate in a substantially horizontal plane, but also periodically move upwardly and downwardly in response to the configuration of the cam edge 24. It will be noted that cam edge 24 is such that the vertical movement of the arms 58 is not uniform, but with the arms rising gradually as they rotate and then dropping suddenly. The arms 58 support one or more streamers or pennants 66 which wave in the air as the arms rotate. The rotation of the arms 58, coupled with their up and down movement in what appears to be an erratic motion, coupled with the waving streamers or pennants 66 has been found from experience to frighten birds away from the foliage F of a tree or bush, and thus prevent the fruit on the tree or bush being eaten by the birds.

Figure 2:
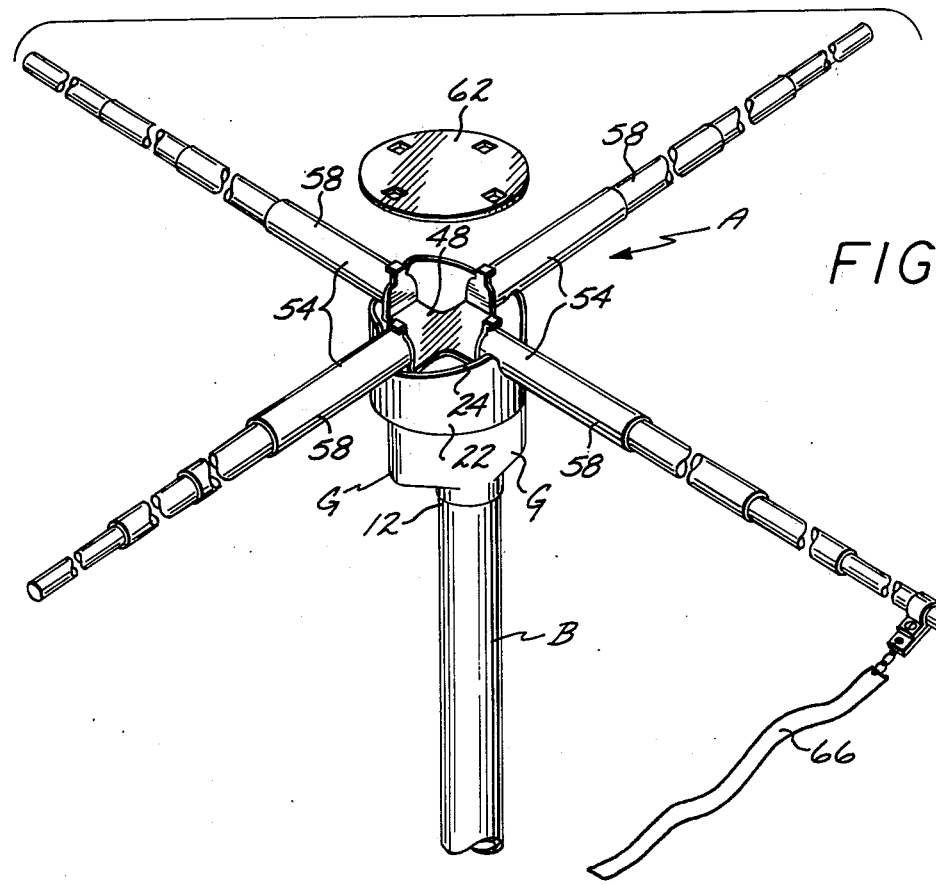
FIG. 2 is a perspective view of the upper portion of the invention and showing in some detail the construction of the motor driven head that rotates a number of outwardly extending arms relative to a cam defining cylindrical shell to have periodic up and down movement imparted to each of the arms, and a locking plate that may removably engage the arms when it is desired to have them rotate concurrently in a common horizontal plane.

Should the streamers 66 become entangled with the foliage F of the tree E, the first and second clutch members 28 and 36 will allow the prime mover G to continue to operate, and if the prime mover is an electric motor it will not burn out, when the plate 62 does not have the slots 64 thereof in engagement with members 60 as shown in FIG. 2, the arms 58 respond individually to the configuration and number of the cam edges 24, and it is possible to have one or more arms 58 rising while the balance of the arms are moving downwardly. By causing the plate 62 to engage the L-shaped members 60 it is possible to hold all of the arms 58 in a common horizontal plane and all of the arms will rise and fall periodically in unison as they rotate relative to the cam edge 24.

The use and operation of the invention has been previously described in detail and need not be repeated.

I claim:

1. A bird frightener that may be removably disposed adjacent a tree or bush that has fruit thereon to prevent the latter being eaten by birds, said bird frightener including:
   a. a pole that has first and second ends, said pole of such length that when said first end is embedded in ground adjacent said tree or bush that said pole extends upwardly through said foilage for said second second end to be disposed thereabove;
   b. a prime mover mounted on said second end, said prime mover including a driven member that is slowly rotated, said driven member having a cavity of noncircular transverse cross section extending downwardly therein;
   c. a first clutch member that includes a depending member of non-circular transverse cross section that slidably and snugly engages said cavity;
   d. a second clutch member axially aligned with said first clutch member and resting thereon;
   e. a head assembly secured to said second clutch member, said head assembly including a plurality of circumferentially spaced pivotally movable tubular members capable of being disposed in outwardly, upwardly and downwardly extending positions;
   f. a plurality of arms that extend outwardly, from said tubular members;
   g. a plurality of streamers secured to said arms; and
   h. cam means on which said tubular members rest when said head rotates, with said cam means imparting periodic up and down movement to said tubular members and arms as they rotate in said outwardly extending positions.

2. A bird frightener as defined in claim 1 in which said first and second clutch members have first and second shallow engaging teeth thereon that permit said first clutch member to rotate relative to said second clutch member.

3. A bird frightener as defined in claim 1 which in addition includes:
   j. engageable means on said second clutch plate and engaging means on said head assembly that removably engage, to removably support said head assembly from said second clutch member.

4. A bird frightener as defined in claim 1 which in addition includes:
   i. a plate having a plurality of circumferentially spaced slots therein, and
   j. a plurality of rigid members that extend upwardly from said tubular vembers that may removably engage said slots in said plate, and said plate when said slots are so engaged serving to hold said tubular members and arms in outwardly extending positions in a common horizontal plane.

5. A bird frightener as defined in claim 1 in which each of said arms is defined by a plurality of tubular telescopically adjustable sections.

* * * * *